(12) United States Patent      (10) Patent No.:  US 12,558,197 B2

Vaccaro      (45) Date of Patent:      Feb. 24, 2026

(54) SECONDARY PART FOR A DENTAL IMPLANT AND DENTAL IMPLANT SET

(71) Applicant: CAMLOG BIOTECHNOLOGIES GMBH, Basel (CH)

(72) Inventor: Antonio Vaccaro, Maulburg (DE)

(73) Assignee: CAMLOG Biotechnologies GmbH, Basel (CH)

( * ) Notice: Subject to any disclaimer, the term of this patent is extended or adjusted under 35 U.S.C. 154(b) by 847 days.

(21) Appl. No.: 16/494,876

(22) PCT Filed: Mar. 14, 2018

(86) PCT No.: PCT/EP2018/056342

§ 371 (c)(1),
(2) Date: Sep. 17, 2019

(87) PCT Pub. No.: WO2018/167124

PCT Pub. Date: Sep. 20, 2018

(65) Prior Publication Data

US 2024/0225792 A1      Jul. 11, 2024

(30) Foreign Application Priority Data

Mar. 17, 2017      (EP) .................................... 17161482

(51) Int. Cl.
*A61C 8/00*      (2006.01)
(52) U.S. Cl.
CPC .......... *A61C 8/0066* (2013.01); *A61C 8/0065* (2013.01)
(58) Field of Classification Search
CPC ... A61C 8/0066; A61C 8/0065; A61C 8/0057; A61C 8/0059; A61C 8/006; A61C 8/0062
See application file for complete search history.

(56) References Cited

U.S. PATENT DOCUMENTS 5,782,918 A * 7/1998 Klardie ................ A61C 8/0069
                                                                433/172
6,382,977 B1 * 5/2002 Kumar ................. A61C 8/0001
                                                                433/214

(Continued)

FOREIGN PATENT DOCUMENTS

KR          20140062212 A      5/2014
WO      WO 2013/187792 A1      12/2013

(Continued)

OTHER PUBLICATIONS

International Search Report and Written Opinion of PCT/EP2018/056342 mailed May 22, 2018, 10 pp.

(Continued)

*Primary Examiner* — Ralph A Lewis
(74) *Attorney, Agent, or Firm* — COOLEY LLP; Andrew Wilkins; Sean Coughlin

(57)      ABSTRACT

The invention relates to a secondary part (1) for a dental implant (2). The secondary part (1) has a head part (3) and a connection part (4). The connection part (4) has at least two spring elements (5), which extend along a longitudinal axis (L) of the secondary part (1). The spring elements (5) have a coronal end (6) and an apical end (7) and are connected at the coronal end (6) to the head part (3) In addition, the at least two spring elements (5) are radially supported with respect to each other at the respective apical ends (7) by an end part (8). A central part (9) of at least one of the supported spring elements (5) is in this case elastically deflectable in a radial direction.

17 Claims, 9 Drawing Sheets

(56) References Cited

U.S. PATENT DOCUMENTS

| | | | | |
|---|---|---|---|---|
| 8,747,112 | B2 * | 6/2014 | Brun .................... | A61C 8/0062 |
| | | | | 433/173 |
| 9,668,833 | B2 * | 6/2017 | Fischer ................ | A61C 8/0068 |
| 10,722,330 | B2 * | 7/2020 | Kim ......................... | A61C 8/00 |
| 11,207,160 | B2 * | 12/2021 | Richard ............... | A61C 8/0056 |
| 2003/0082499 | A1 * | 5/2003 | Halldin ............... | A61C 8/0001 |
| | | | | 433/172 |
| 2010/0184002 | A1 * | 7/2010 | Ranck ................. | A61C 8/0001 |
| | | | | 433/172 |
| 2011/0171599 | A1 | 7/2011 | Seo et al. | |

FOREIGN PATENT DOCUMENTS

| | | | |
|---|---|---|---|
| WO | WO 2014/025081 A1 | 2/2014 |
| WO | WO 2014/051172 A1 | 4/2014 |

OTHER PUBLICATIONS

International Preliminary Report on Patentability of PCT/EP2018/056342 mailed Sep. 17, 2019, 7 pp.

* cited by examiner

SECONDARY PART FOR A DENTAL IMPLANT AND DENTAL IMPLANT SET

RELATED APPLICATIONS

This application is a 35 U.S.C. § 371 filing of International Patent Application No. PCT/EP2018/056342, filed Mar. 14, 2018, which claims the benefit of European Patent Application No. 17161482.9, filed on Mar. 17, 2017, the entire disclosures of which are hereby incorporated herein by reference.

FIELD OF THE INVENTION

This invention relates to a secondary part for a dental implant and a set consisting of a secondary part and a dental implant according to the preambles of the independent claims.

BACKGROUND OF THE INVENTION

Dental implants are inserted into a patient's jawbone. First, the gum (gingiva) is lifted off the bone and an implant bed is prepared in the jawbone. The dental implant is then inserted into the implant bed using an insertion post. After completion of the surgical procedure, a healing cap or gingiva former is placed in or on the dental implant. If a dental implant is not optimally inserted, it can be turned back again using a turning instrument in the drill hole. After the gingiva has healed, the healing cap or gingiva former can be replaced with a scanbody or impression post to determine the position of the dental implant. Alternatively, an exact imprint of the position of the dental implant can be taken with an impression post. The scan or imprint is used to create a tooth reconstruction that can be placed on or into the dental implant using abutments.

The dental implant is handled and used with various instruments or accessories with versatile requirements. The instruments or accessories therefore require a versatile interface to engage the dental implant.

US 2013/0171584 shows abutments that are inserted into a dental implant. One of the abutments from US 2013/0171584 contains bendable fingers. The flexible fingers contain a projection pointing radially outwards that engages a counter contour of the dental implant. In addition, the document shows struts with connections between the struts that extend distally across the fingers and align the abutment relative to the dental implant. The disadvantage of the fingers is that they lose their elasticity over time and wear out.

U.S. Pat. No. 9,119,688 B2 shows an insertion post for a dental implant. The insertion post has bendable arms extending from a coupling part. The flexible arms engage in an undercut of the dental implant. U.S. Pat. No. 9,119,688 has the same disadvantages as US 2013/0171584. In addition, the insertion post has the disadvantage that there are slits between the arms that can jam each other when present in bulk quantities.

EP 1 263 345 B1 shows a combination of an impression cap and a dental implant. The impression cap has a first end that connects to a dental implant in a snap-in manner. For this purpose, the first end has several resilient teeth that engage in several corresponding recesses within a coronal opening of the dental implant. The teeth have the disadvantage that they lose their function over time.

BRIEF SUMMARY OF THE INVENTION

It is therefore the objective of the invention to overcome the disadvantages of the state of the art. In particular, a device is to be provided which can establish a stable and secure connection between secondary parts and dental implants. Particularly preferably, the connection is releasable and insertable oftentimes without losing its function.

The term secondary part refers to all parts that are mounted on or inserted into the implant, such as instruments such as unscrewing instruments, scan bodies, impression posts and insertion posts or additional parts such as gingiva formers, healing caps, selection abutments, positioning aids or build-up parts such as abutments.

This objective is achieved by the devices defined in the independent patent claims. Further embodiments result from the dependent patent claims.

A first aspect of this invention concerns an secondary part for a dental implant. The secondary part contains a head part and a connecting part. The connecting part has at least two spring elements that extend along a longitudinal axis of the secondary part. The spring elements have a coronal and an apical end and are connected to the head section at the coronal end. In addition, the at least two spring elements are radially supported with respect to each other by an end part at the respective apical end. A central part of at least one of the supported spring elements is elastically deflectable in a radial direction.

Preferably, the central part of at least one supported spring element is, with respect to a central part of a second support spring element, elastically radially deflectable further than the apical end of the supported spring element radially with respect to an apical end of the second supported spring element. The radial deflection can point in a radially inward or a radially outward direction.

Preferably the middle part of at least one or at least two or at least three or at least four or all spring elements is deflectable further in radial direction than the apical end by forces generated during insertion.

The forces generated during insertion are preferably radial forces that are usually transferred from a dental implant to the secondary part when the secondary part is inserted into a dental implant as intended.

Such spring elements have the advantage that they can be reused several times because they retain their shape and/or elasticity in a durable manner.

Examples of spring elements are elongated struts. The spring elements are preferably elastic due to their shape. Alternatively or additionally, the spring elements are made of a material which is more elastic than that of the end part and/or the remaining connecting part and/or the head part. Preferably, the spring elements can obtain their elastic properties by an increasing and/or decreasing wall thickness along the longitudinal direction.

In a preferred embodiment, the spring elements are elongated such that they are deflectable in a radial direction due to their shape. This has the advantage that special shape memory alloys are not required to deform the struts in the radial direction. Shape memory alloys are laborious to produce. In addition, shape memory alloys must be activated.

In a preferred embodiment, an outer diameter of the connecting part is relatively large in relation to the radial width of one of the spring elements or all spring elements. Suitable ratios (outer diameter to radial width) are greater than 3, preferably greater than 5, 6, 7 or 8. In some inventive embodiments, the ratio is between 6 and 10, preferably 6.5 and 8. This makes the spring element elastically deflectable. The outside diameter can indicate an outside diameter of the protrusions (if any) or—preferably—an outside diameter of the spring elements themselves. The radial width is measured relative to a longitudinal axis of the secondary, preferably at a right angle.

In a preferred embodiment, the cross-sectional area of the head part is large relative to the cross-sectional area of one or more or all spring elements. In a preferred embodiment, large means that the ratio of the cross-sectional area of the head part to the cross-sectional area of a spring element is greater than 9, preferably greater than 15 and particularly preferably greater than 20. In certain embodiments the ratio may be 27 or more.

Cross-sectional area means, in the present application, an area in a cross-section perpendicular to the longitudinal axis of the secondary part.

Advantageous secondary parts are easily insertable into the implant and easily removable again. In addition, the secondary parts should at the same time provide a sufficient holding force. The above ratios to radial width, cross-sectional area and outer diameter define secondary parts that offer these advantages.

The spring elements can be elongated in a preferred embodiment. In particular, a ratio between the radial width and a length of the spring elements in a range from 5 to 20 is preferred, particularly preferably from 8 to 18, further preferred from 9 to 16.

The spring elements can be connected directly or indirectly to the head part.

The spring elements are preferably spatially separated from one another. Alternatively, the spring elements can also be designed as segments, in particular circular segments, within a interconnected structure.

Preferably, the connecting part has an axial length of 1 mm to 7 mm, particularly preferably 2 mm to 3.5 mm.

Preferably, the connecting part has an anti-torsion guard. Connecting parts with an anti-torsion guard preferably have a length of 2 mm to 10 mm, particularly preferably 4 mm to 7.5 mm, further preferably 5 mm to 6 mm.

Preferably, the spring elements have an axial length of 0.5 mm to 10 mm, particularly preferably 1 mm to 4 mm.

Preferably, the connecting part has a diameter of 0.6 mm to 12 mm, particularly preferably a diameter of 1.2 mm to 3 mm.

The spring elements are preferably configured such that an axial pull-off force of the secondary part is between 0.5 N and 40 N, particularly preferably between 0.5 N and 20 N, and further preferably between 1 N and 10 N.

The pull-off force can be influenced by the length of the spring elements, their area moment of inertia and the Young's modulus of the selected material.

In a preferred embodiment, the central part is provided with holes in the circumferential direction between the spring elements, in particular elongated holes. The elongated holes preferably extend along the longitudinal axis.

Preferably, two, three or four elongated holes are provided, which are arranged between two, three or four spring elements, particularly preferably in the circumferential direction of the secondary part.

This allows the spring elements to be spatially separated. In addition, these spring elements can be easily manufactured.

In a preferred embodiment, the connecting part has at least three or at least four spring elements. Particularly preferably, the connecting part has three or four or more spring elements.

These embodiments are particularly easy to produce.

In a preferred embodiment at least three, particularly preferably four, spring elements are radially supported by the end part. Particularly preferably three or four or more spring elements are radially supported.

This limits the deflectability of the end part. At the same time, the elastic deflectability of the central part of the spring elements is almost unchanged.

Preferably, at least one spring element is supported in the circumferential direction by its two adjacent spring elements.

In a particularly preferred embodiment, all spring elements which extend from the head part in the apical direction are supported by the end part.

In a preferred embodiment, at least one spring element has at least one protrusion and/or at least one recess in the radial direction with respect to the longitudinal axis. Particularly preferably, at least three or at least four spring elements have a protrusion and/or a recess. Particularly preferably, three or four spring elements have a protrusion and/or a recess.

A spring element may have one, two, three or more protrusions. A spring element may have one, two or more recesses.

In an advantageous embodiment, all spring elements have a protrusion and/or a recess. The protrusion and/or recess is advantageously located in the central part between the apical and coronal ends of the spring elements. Preferably, the protrusion points in a radially outer direction. In one variant, at least one, preferably all, spring element (s) has exactly one protrusion.

In a particularly preferred variant, all spring elements have exactly one protrusion, which is arranged in the middle of the spring element along the longitudinal axis of the secondary part.

This allows a snap-in position of the secondary part in the dental implant to be predetermined, in which the protrusion snaps into a groove of the dental implant or in which the recess snaps into a protrusion of the dental implant.

In a preferred embodiment, the at least one protrusion and/or the at least one recess has a continuous profile in the longitudinal direction.

A continuous profile means that the spring element has no steps in the longitudinal direction in the area of the protrusion or recess, i.e. in particular no surfaces with a normal in the longitudinal direction.

This allows the secondary part to be removed again after being snapped into a recess or protrusion in the dental implant without additional tools.

Preferably, at least one protrusion of a spring element has a surface that is inclined in a radial direction.

Due to the inclined surface, an outer surface of the protrusions is smaller and the secondary part can be moved between positions, preferably axially, with less force.

In a preferred embodiment, an outer surface of at least one spring element is radially curved outwardly. An inner surface is preferably curved radially outwardly. The designations outwardly and inwardly refer to a radial direction, which is defined by the longitudinal axis of the secondary part.

This allows the secondary part to be inserted into the inner contours of a dental implant with a smooth wall and/or a slightly conical wall. A further advantage is that the spring elements can have a preload and can therefore exert higher frictional forces and better securing can be achieved.

In a preferred embodiment, at least one of the coronal and/or apical ends of the spring elements exhibits a thicker portion. This allows the spring elements to absorb forces transverse to the longitudinal axis and/or bending moments transverse to the longitudinal axis more uniformly. Particularly preferably, the thicker portion extends in a radially inner direction.

In a preferred embodiment, the end part runs parallel to a plane perpendicular to the longitudinal axis.

In a preferred variant, the end part is additionally connected to the head part by an additional stiffening element. The stiffening element is preferably arranged centrally between at least two spring elements. Particularly preferably, the stiffening element is arranged in the center between all spring elements.

The end part is preferably three-edged. The end part is particularly preferably four-, five-, six- or multi-edged. Preferably, the number of edges corresponds to the number of spring elements.

This limits the mobility and thus the deflectability of the end part.

Preferably, the end part is radially delimited by a circle with a diameter of 0.6 mm to 6 mm, preferably 1.2 mm to 3 mm.

In a particularly preferred embodiment, the stiffening element is a cylinder, preferably a full cylinder, with a three- or four-edged cross-section, particularly preferably with a square cross-section.

Such stiffening elements can be manufactured easily.

Alternatively, the stiffening element is a round, preferably circular, cylinder, preferably a full cylinder.

In a preferred embodiment, the connecting part consists of a single material. Particularly preferably, the entire secondary part consists of a single material. Preferably the material is a metal or a metal alloy. Particularly preferred metals or metal alloys are steel, spring steel, titanium or a titanium alloy, cobalt-chromium alloys and nitinol. Alternatively, the connecting part or the secondary part can also be made of plastic. Preferred materials are PEEK, PEKK, PAEK, POM, PC, PET and fiber-reinforced variants of these plastics.

In one variant, the secondary part is made without shape memory alloys such as Nitinol.

In a preferred embodiment, the connecting part also contains an anti-torsion guard that is not rotationally symmetrical about the longitudinal axis. The non-rotationally symmetric torsion guard is preferably engageable with a counter contour of the dental implant. Particularly preferably, the anti-torsion guard is arranged between the spring elements and the head part.

This determines a rotational position of the secondary part in relation to the dental implant. In addition, torques, in particular torsional moments, can be transmitted.

In a preferred embodiment, the anti-torsion guard is formed by an outer contour. Particularly preferably, the anti-torsion guard has at least one cam and/or recess. Additionally or alternatively, the anti-torsion guard can also have a multi-edged outer contour.

Torques, in particular torsional moments, can be transmitted more effectively via outer contours. Alternatively, the anti-torsion guard can be formed by an inner contour.

In a preferred embodiment, the head part of the secondary part is designed so that the secondary part forms an insertion post, a healing cap, a gingiva former, a scan body, an impression post, a selection abutment, a positioning aid, an abutment, or an unscrewing instrument.

Another aspect of the invention relates to a set comprising a dental implant and an secondary part as described above.

In a preferred embodiment, the dental implant has a cavity with at least one recess and/or at least one protrusion. The recess is preferably a groove, particularly preferably the groove is formed by a thread.

In a preferred embodiment, the recess can be formed by a thread, a circumferential groove or individual indents. The recess or protrusion is preferably engageable with a corresponding protrusion or recess of the spring elements.

The recess and/or the protrusion can be brought into connection with the spring elements and thus increase the holding force of the spring elements. In addition, an end position of the secondary part can be defined.

In a preferred embodiment, the cavity has a longitudinal direction and is conical along the longitudinal direction.

BRIEF DESCRIPTION OF THE SEVERAL VIEWS OF THE DRAWINGS

With reference to figures, which only represent exemplary embodiments, the invention is explained in detail in the following. Schematically shown are in.

DETAILED DESCRIPTION OF THE INVENTION

Figure 1:
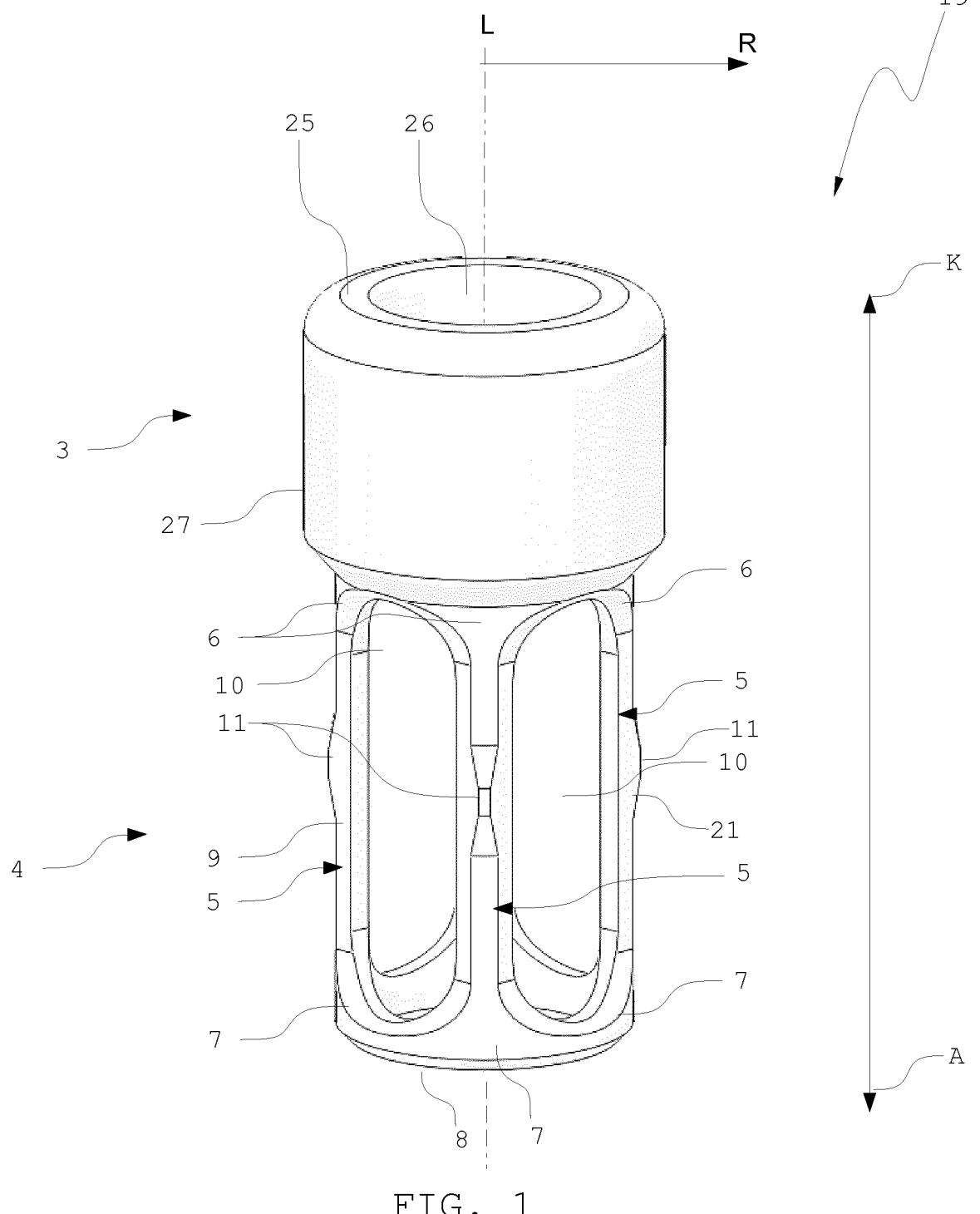
FIG. 1: A perspective depiction of an embodiment of a gingiva former according to the invention.

The perspective illustration in FIG. 1 shows a secondary part 19 with a head part 3 and a connecting part 4. The secondary part is designed as a gingiva former. The head part 3 is arranged in a coronal direction K and the connecting part 4 is arranged in an apical direction A. The coronal direction K points in the direction of a tooth crown. The apical direction A points in the direction of an implant tip.

At a coronal end 25 of the head part, a recess 26 is provided in which an engagement contour is arranged. A tool for inserting the gingiva former 19 into a dental implant 2 (see FIG. 8) can be inserted into recess 26. Furthermore, the head part 3 has a cylindrical section 27 with which a gingiva can be formed.

Apically from head part 3 the connecting part 4 is provided. Coronal ends 6 of four spring elements 5 follow directly on the head part. The spring elements 5 are designed as elongated struts and extend in the direction of a longitudinal axis L of the gingiva former. An end part 8 is connected to the spring elements at the opposite apical ends 7 of the spring elements 5. Four slotted holes 10 are provided between the four spring elements 5. The four spring elements are shaped in the same way and are fitted at even intervals along a circumference of the gingiva former.

The end part 8 is a circular plate and arranged in the center between the spring elements 5. Furthermore, the end part is arranged concentrically to the cylindrical section 27.

In a central part 9 the spring elements 5 have protrusions 11. The protrusions 11 extend, from the view of the longitudinal axis L, in a radial direction R outwardly. The protrusions 11 have a continuous profile 21 with a continuous transition, i.e. a transition without a jump to the remaining radial outer contour of the spring elements 5.

Figure 2:
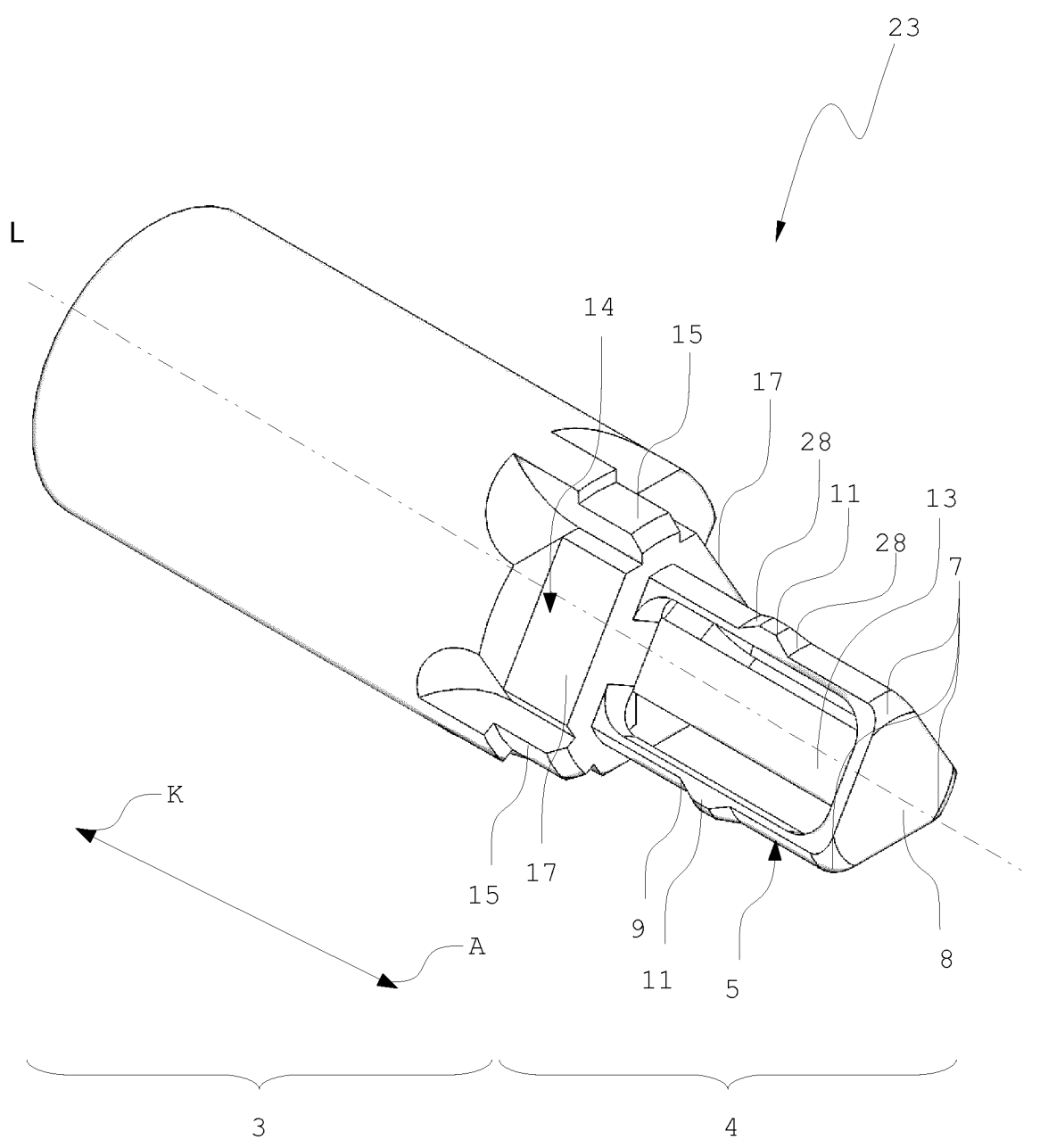
FIG. 2: a perspective depiction of the first embodiment of an unscrewing instrument according to the invention.

FIG. 2 shows a perspective view of a first embodiment of the invention of a secondary part 23, which is designed as a unscrewing instrument. Dental implants that have already been inserted into the bone can be unscrewed using the unscrewing instrument 23. A connecting part 4 contains an anti-torsion guard 14, as well as spring elements 5 extending from it and an end part 8. The anti-torsion guard 14 is fitted between spring elements 5 and head part 3. Due to the anti-torsion guard 14, torques can be transferred from the unscrewing instrument 23 to the dental implant 2. The anti-torsion guard 14 has three cams 15 for this purpose. The three cams 15 are evenly distributed along the circumference of the unscrewing instrument. In addition to the cams 15, the unscrewing instrument has a three-edged outside with three surfaces 17. The cams 15 are brought into engagement with a corresponding counter contour of the dental implant 2.

Figure 8:
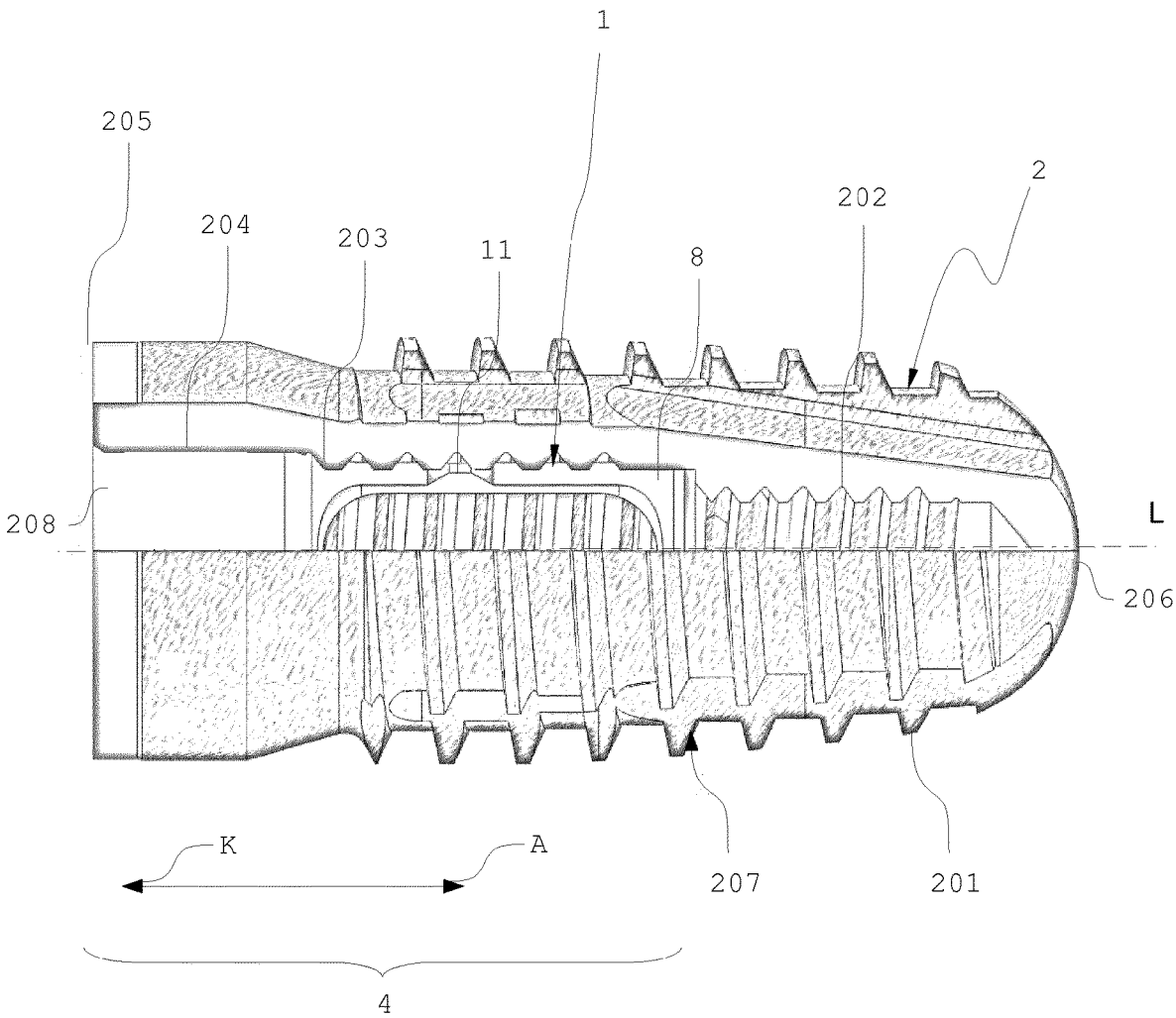
FIG. 8: a half-section view of a secondary part inserted into a dental implant.

The three surfaces 17 are flat and thus form an undercut with respect to a round recess in an implant (see FIG. 8). This makes it easier to guide the unscrewing instrument 23 and protects the inner surfaces of the implant.

The unscrewing instrument 23 is secured in longitudinal direction L by three spring elements 5 in the implant. The three spring elements 5 support each other at their apical end 7 through the end part 8. As a result, the spring elements are only deformed at a central part 9. A protrusion 11 then engages in a corresponding recess in the dental implant 2. Angled surfaces 28 are provided in a coronal direction K and in an apical direction A of the protrusion 11. Due to the angled surfaces, the protrusion 11 is initially deformed radially inwardly during insertion and snaps into a recess due to the elastic spring forces as soon as the corresponding recess is reached. As soon as a procedure with the unscrewing instrument is completed, the unscrewing instrument can be removed again. During removal, the central part 9 is pressed radially inwardly by the angled surfaces 28 of the protrusion 11.

In a radial center between the spring elements 5 a stiffening element 13 is provided. The stiffening element 13 extends from the anti-torsion guard 14 to the end part 8 and has a three-edged cross-section. The end part is plate-shaped.

Figure 3:
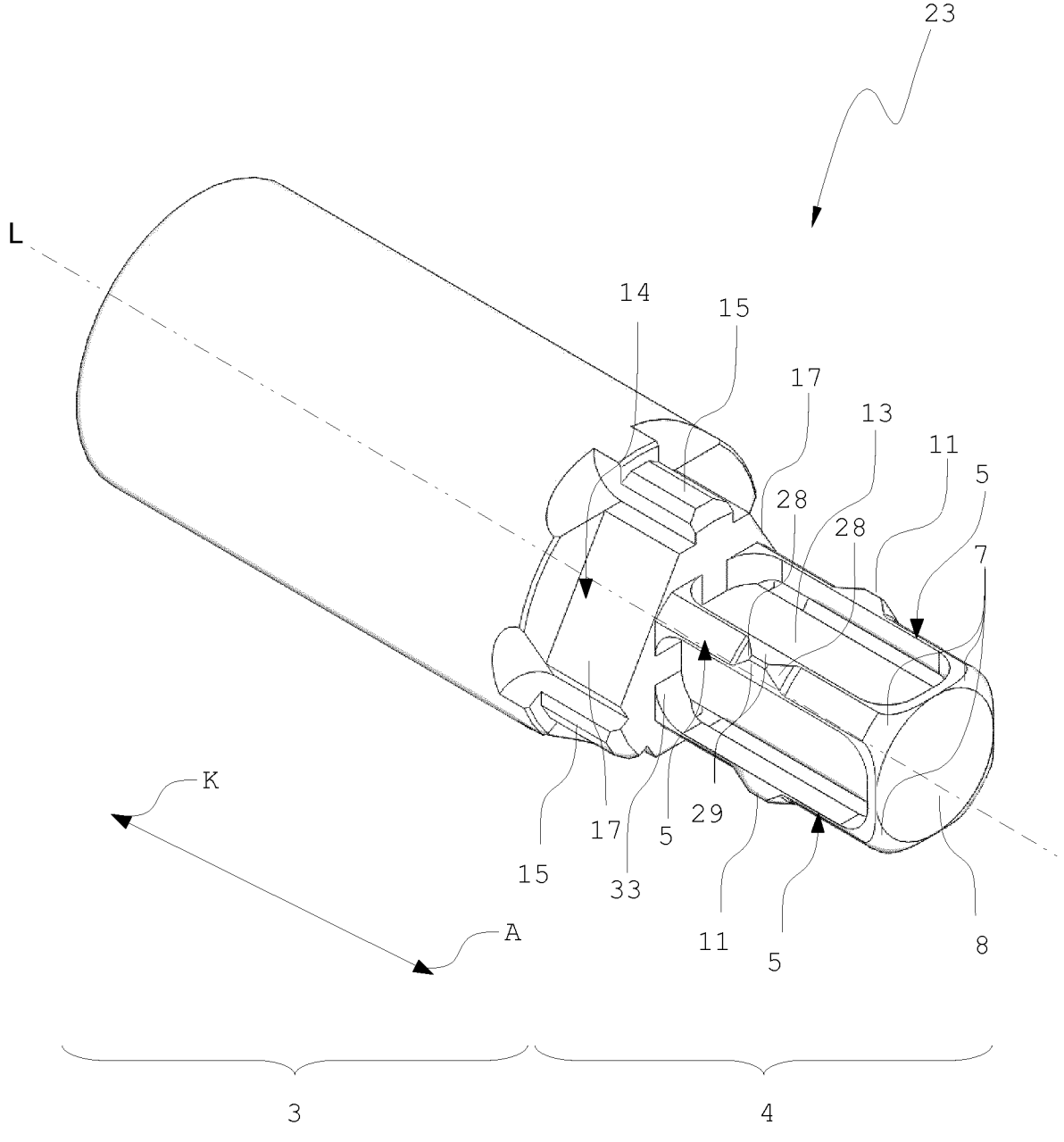
FIG. 3: a perspective depiction of a second embodiment of an unscrewing instrument according to the invention.

FIG. 3 shows a perspective view of a second embodiment of a secondary part 23 according to the invention, which is designed as a unscrewing instrument. Like the secondary part 23 in FIG. 2, the unscrewing instrument 23 has an anti-torsion guard 14, spring elements 5 with protrusions 11 and an end part 8 at the apical end 7 of the spring elements 5. Contrary to the unscrewing instrument 23 from FIG. 2, the unscrewing instrument 23 from FIG. 3 has four spring elements 5. The protrusions of the spring elements 5 again contain the inclined surfaces 28 in longitudinal direction L. In addition, the protrusions 11 of the unscrewing instrument 23 have laterally inclined surfaces 29.

Due to the inclined surfaces 29, an outer surface of the protrusions 11 is smaller and the secondary part 23 can be moved between engagement positions with less force.

Furthermore, the unscrewing instrument 23 also has a stiffening element 13. The stiffening element 13 extends from the anti-torsion guard 14 to the end part 8 and runs parallel to the spring elements 5. The stiffening element 13 is designed as a cylinder with a square cross-section. A longitudinal axis of the stiffening element is identical to the longitudinal axis L.

Figure 4:
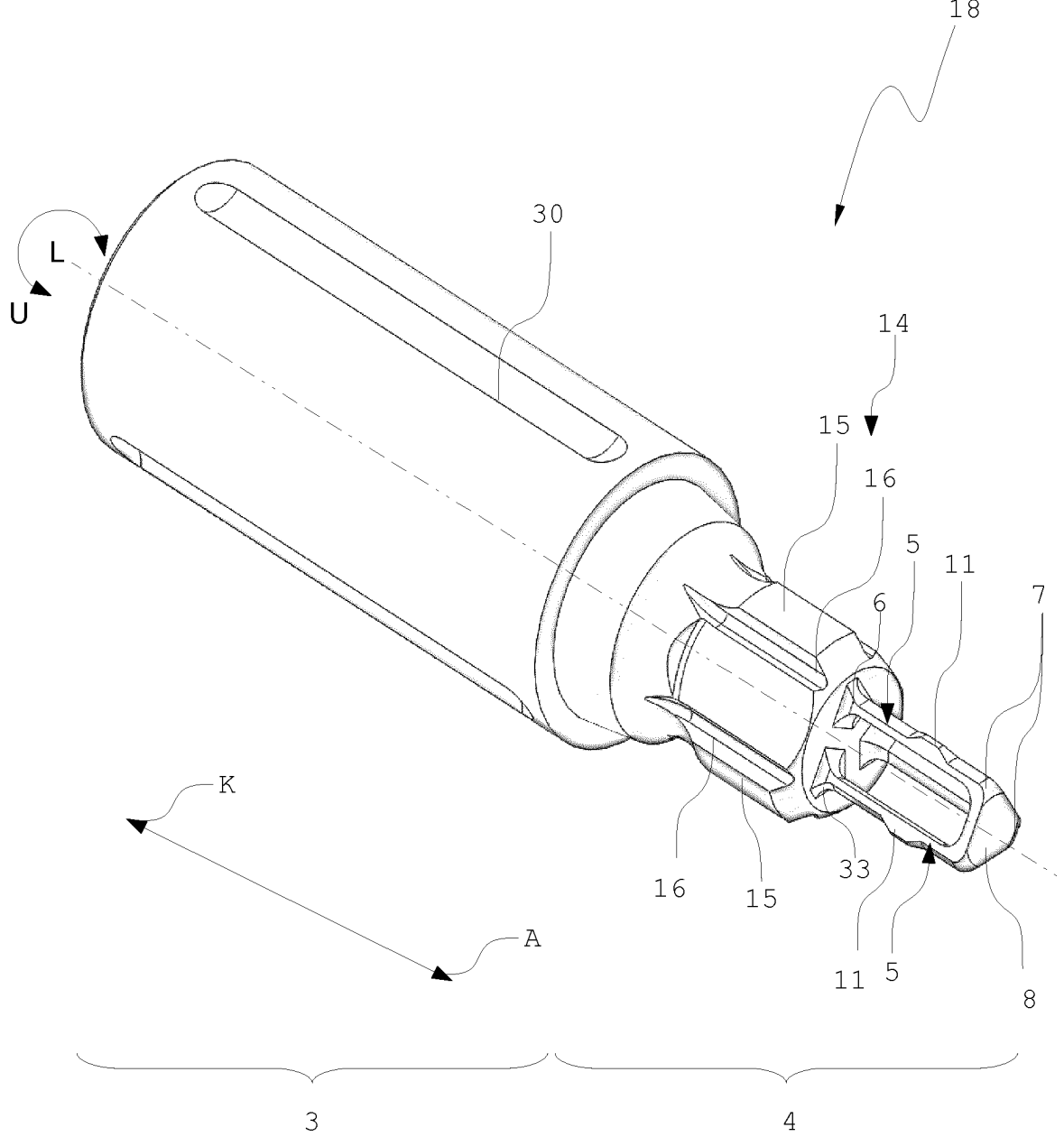
FIG. 4: a schematic depiction of a first embodiment of a insertion post according to the invention.

FIG. 4 shows a perspective view of a first embodiment of a secondary part 18 according to the invention, which is designed as an insertion post. The secondary part 18 has a head part 3 and a connecting part 4. The connecting part 4 secures the dental implant 2 along a longitudinal axis L and in the circumferential direction U to the longitudinal axis L. The dental implant 2 can be held by a user at the head part 3 without touching the dental implant 2. In addition, the dental implant 2 can be transported and stored by the head part 3 without touching sensitive surfaces of the dental implant 2 and thus damaging them. The head section 3 is arranged on an apical side and has elongated grooves 30.

The connecting part 4 has an anti-torsion guard 14, spring elements 5 and an end part 8. The anti-torsion guard 14 comprises elongated cams 15. Between the cams 15 there are elongated indents 16. Elastic spring elements 5 extend from one apical end of the anti-torsion guard 14. The elastic spring elements 5 contain protrusions 11. The end part 8 in the embodiment of FIG. 4 is three-edged. The end part can also be four, five, six or multi-edged. FIG. 4 also shows that the spring elements 5 have a thicker portion 33 at their coronal ends 6.

The cams 15 as well as the protrusions 11 are engaged with the corresponding counter contours of the dental implant 2. To make it easy for the user to see the orientation of the insertion post 18, the elongated grooves 30, the cams 15 and the protrusions 11 are located in the same position in the circumferential direction U.

Figure 5:
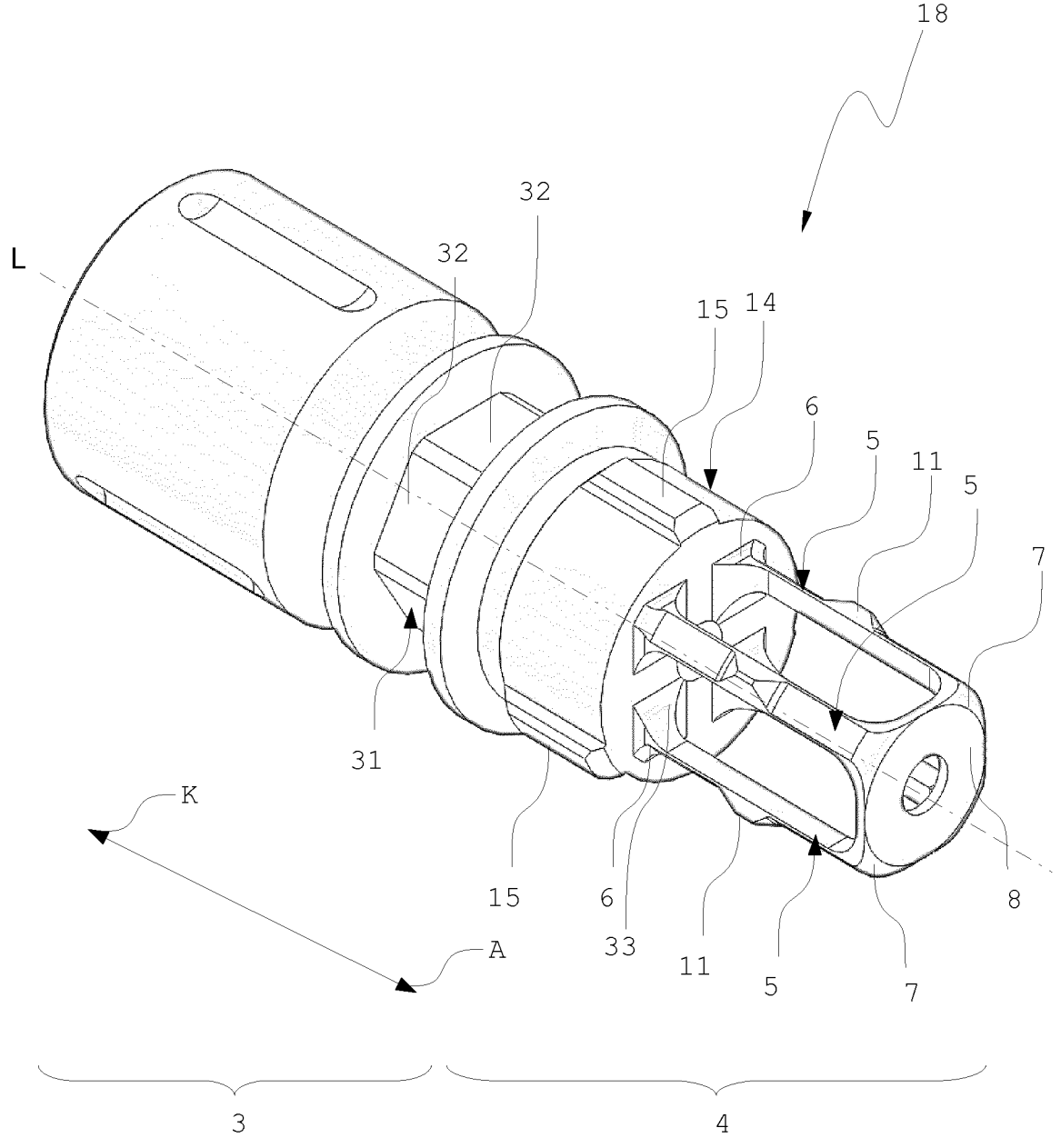
FIG. 5: a perspective view of a second embodiment of a insertion post according to the invention.

Another embodiment of a secondary part 18 according to the invention, which is designed as an insertion post, is shown in FIG. 5. In contrast to the insertion post from FIG. 4, the anti-torsion guard 14 is only formed by cams 15. A circular cylindrical body extends between the cams 15.

Furthermore, the head part 3 has an additional support section 31. The support section 31 has a six-edged contour 32. By means of the six-edged contour 31 the insertion post 18 can be held by packaging (not shown).

The coronal end 6 of each of the spring elements 5 has a thicker portion 33. The thicker portion 33 extends around a circumference of the spring elements. The thicker portion 33 extends in a radially inner direction of the secondary part 18.

Figure 6:
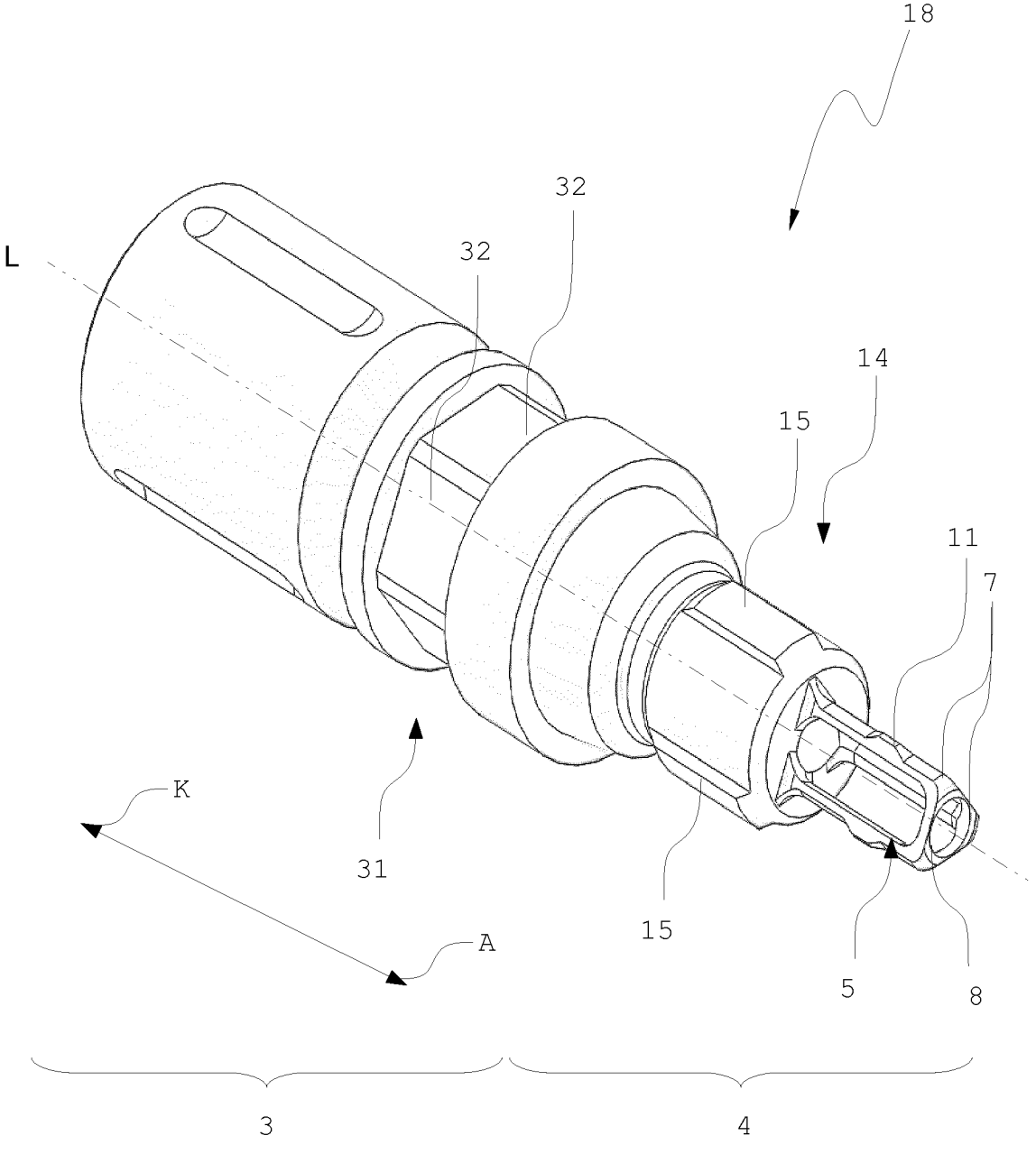
FIG. 6: a perspective depiction of a third embodiment of a insertion post according to the invention.

FIG. 6 shows a perspective depiction of a third embodiment of a secondary part 18 according to the invention, which is in the form of an insertion post. The insertion post of FIG. 6 combines the anti-torsion guard 14 and the support section 31 of the insertion post of FIG. 5 with the three spring elements 5 of FIG. 4.

Figures 7A, 7B, 7C:
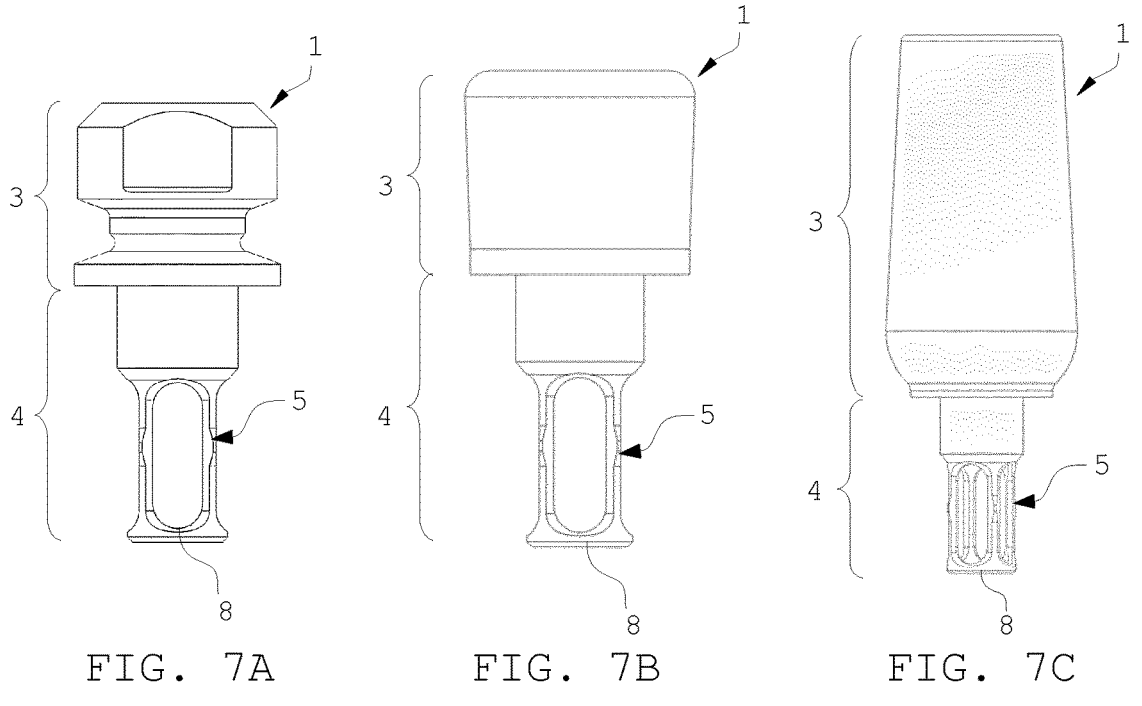
FIG. 7A to 7G: different embodiments of a head part of secondary parts.
Figures 7D, 7E, 7F, 7G:
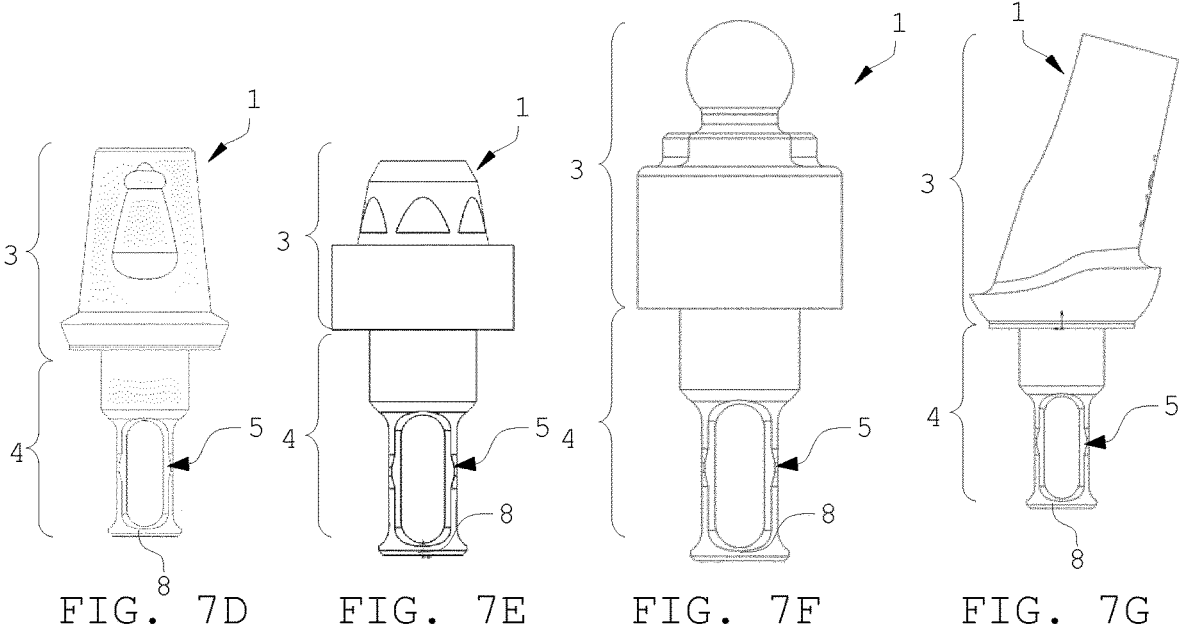

FIGS. 7A to 7G show different head parts 3 of secondary parts 1. In FIG. 7A the head part is formed as an insertion post. In FIG. 7B, the head part is configured as a gingiva former. FIGS. 7C to 7G show head parts which are formed as different abutments, namely as a modifiable standard abutment (FIG. 7C), prefabricated standard abutment (FIG. 7D), bridge structure (FIG. 7E), ball structure (FIG. 7F) and as an angled abutment (FIG. 7G). Of course the circular part between spring elements 5 and head part 3 can also be constructed as anti-torsion guard 14, as shown in FIGS. 2 to 6. The spring elements 5 and the end part 8 can also be designed like the spring elements 5 of FIGS. 2 to 6.

FIG. 8 shows a connecting part 4 of an secondary part 1 inserted into a dental implant 2. FIG. 8 shows a half-section in which an upper half of the figure shows a sectional view of the dental implant. Dental implant 2 has a coronal end 205 and an apical end 206. An outer contour 207 is formed as thread 201. Thread 201 engages a patient's jawbone. Inside the dental implant 2, an elongated recess 208 extends from the coronal end 205. An anti-torsion guard is arranged in the recess 208 adjacent to the coronal end 205. The anti-torsion guard forms a counter contour 204 to the anti-torsion guard 14 in FIG. 5. The anti-torsion guard therefore has a profile that is not rotationally symmetrical. The non-rotationally-symmetrical profile in FIG. 8 is circular with corresponding grooves so that the counter contour 204 can be inserted with the circular cylinder and the cams from FIG. 5 in a form-fit manner. A first internal thread 203 is provided apically of the anti-torsion guard. When secondary part 1 is inserted into dental implant 2, secondary part 1 is inserted in the longitudinal direction L into recess 208. A cross-section of the end part 8 is smaller than an internal cross-section of the thread 203 and the counter contour 204.

By contrast, the protrusions 11 project radially outwards from the spring elements 5. If the secondary part 1 is inserted, the protrusion 11 is pressed inwards by the thread 203. The spring elements 5 counteract this force, resulting in a frictional connection. If the secondary part is pushed further in the longitudinal direction, the protrusions snap into one groove of thread 203 and secure the secondary part in the longitudinal direction L. The protrusion 11 can secure the secondary part 1 in any groove of the thread. As soon as a user has reached the desired position, he can leave the secondary in this position without further securing measures.

An end position is defined by the end part 8, which hits a narrowing cross-section at the end of the thread 203. In addition to the first thread 203, a second thread 202 is provided. The second thread 202 can be used to additionally or alternatively secure a secondary part with a screw, in particular a chimney screw.

In an alternative embodiment to FIG. 8, the connecting part 4 of secondary part 1 can also be inserted into the second thread 202 and secure the secondary part in the longitudinal direction L at pitches of the second thread. An end position of the secondary part is then determined by an apical end of the recess 208.

Figure 9:
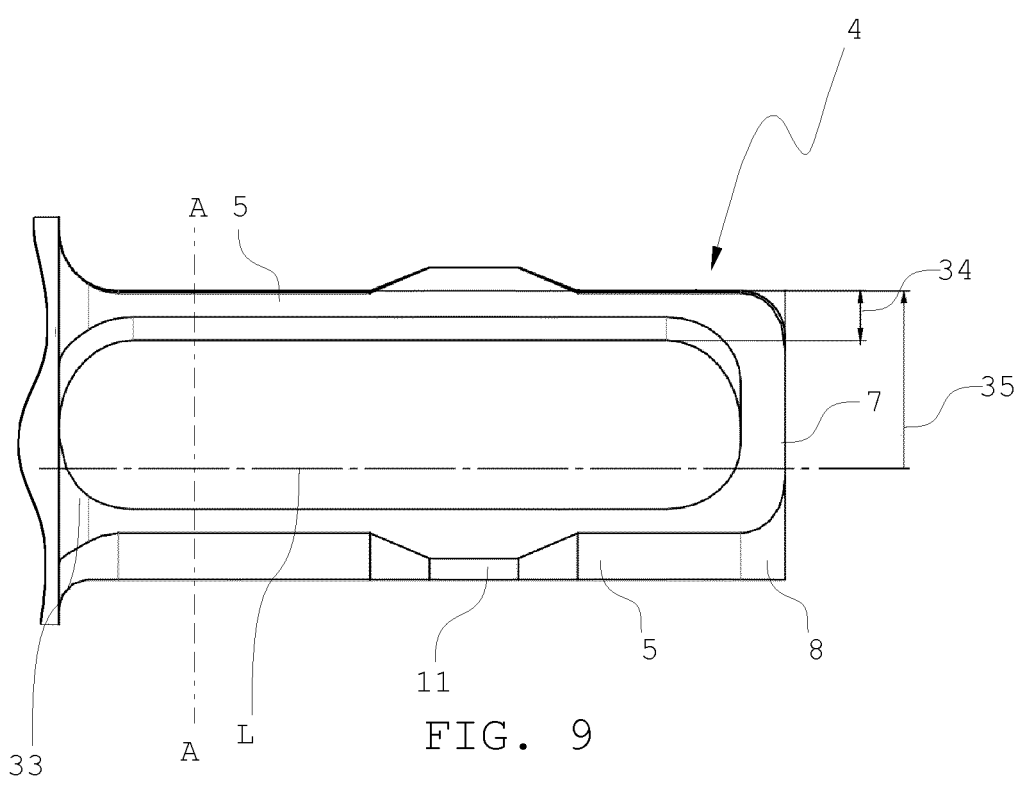
FIG. 9: a side view of a connecting part

FIG. 9 shows a side view of a connecting part 4. FIG. 9 shows the connecting part 4 of the insertion post 18 shown in FIG. 6. The connecting part 4 shown in FIG. 9 could also be combined with all head parts 3 of FIGS. 7A to 7G.

The spring elements 5 shown in FIG. 9 have a radial width 34. The connecting part 4 has an outer diameter 35. FIG. 9 shows that the radial width is relatively small in relation to the outer radius 35. In the example, the ratio is approximately 4. This means that a ratio between the outer diameter and the radial width is approximately 8.

Figure 10:
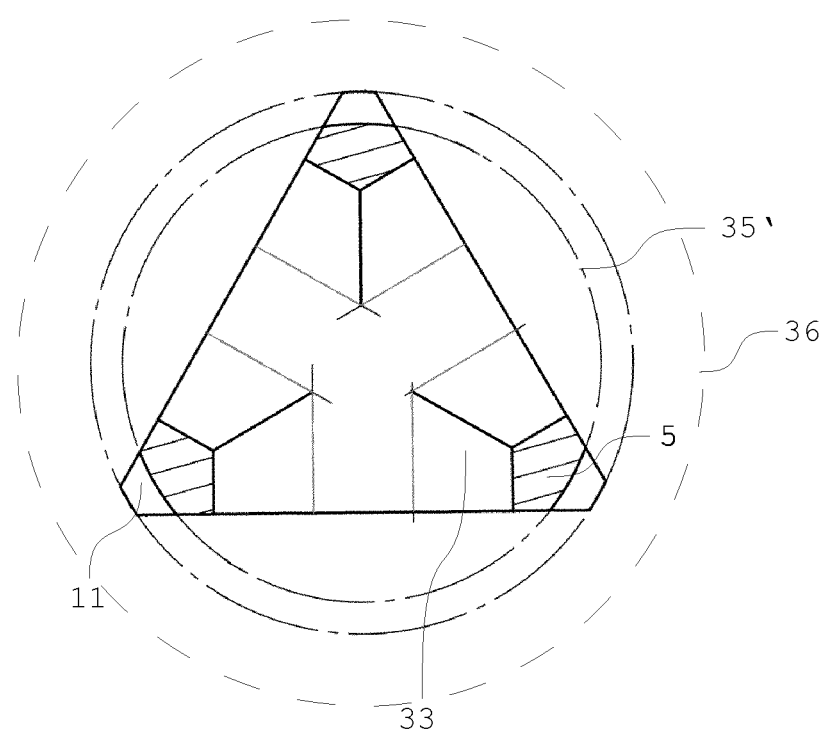
FIG. 10: a cross-section of the connecting part from FIG. 9.

FIG. 10 shows a cross-section through the axis A-A (see FIG. 9). FIGS. 9 and 10 depict the length ratios of an embodiment of a connecting part 4 to scale. FIG. 10 shows that a cross-sectional area of the spring elements 5 is small in relation to a cross-sectional area of the head part (indicated by the outer line 36). The ratio shown is approximately 27 to 1. Because the spring elements 5 are relatively thin, they attain their elastic property and can deform elastically radially inwardly when inserted into an implant 201 as shown in FIG. 8.

The invention claimed is:

1. Secondary part for a dental implant, comprising
a head part and
a connecting part for insertion into the dental implant, the connecting part having at least two spring elements, which are formed as elongated struts and which extend, from the head part, along a longitudinal axis of the secondary part in an apical direction, and each having
a coronal end
an apical end and being connected to the head part at the coronal end,
wherein the at least two spring elements are radially supported with respect to each other at the respective apical ends by an end part, wherein the spring elements have
a central part,
wherein each spring element comprises one of a protrusion and a recess positioned in the central part of each respective spring element, and the central part of at least one of the supported spring elements is elastically deflectable in a radial direction such as to exert an axial force of less than 40 N when each one of the protrusion and recess snaps into a corresponding counter-contour of the dental implant, further wherein a ratio between an outer diameter of the connecting part and radial width of each spring element is greater than 5.

2. Secondary part according to claim 1, characterized in that holes are provided in the central part in the circumferential direction between the spring elements.

3. Secondary part according to claim 1, characterized in that the connecting part comprises at least three spring elements.

4. Secondary part according claim 1, characterized in that at least three spring elements are radially supported by the end part.

5. Secondary part according to claim 1, characterized in that each of the protrusion and the recess has a continuous profile in the longitudinal direction.

6. Secondary part according to claim 1, characterized in that at least one of the spring elements are outwardly curved in the radial direction.

7. Secondary part according to claim 1, characterized in that the end part lies in a plane orthogonal to the longitudinal axis.

8. Secondary part according to claim 1, characterized in that the end part is additionally connected to the head part via a stiffening element.

9. Secondary part according to claim 1, characterized in that the connecting part consists of a single material.

10. Secondary part according to claim 1, characterized in that the connecting part additionally contains an anti-torsion guard which is not rotationally symmetrical about the longitudinal axis.

11. Secondary part according to claim 10, characterized in that the anti-torsion guard is formed by an outer contour.

12. Secondary part according to claim 10, characterized in that the anti-torsion guard comprises at least one of a cam, a recess, and a multi-edged outer contour.

13. Secondary part according to claim 1, characterized in that the head part is configured such that the secondary part forms one of an insertion post, healing cap, gingiva former, scan body, impression post, abutment, selection abutment, positioning aid and an unscrewing instrument.

14. Set comprising a dental implant and a secondary part according to claim 1, wherein the dental implant has a cavity for receiving the secondary part, and wherein at least one recess and at least one protrusion is arranged within said cavity.

15. Set according to claim 14, characterized in that the cavity of the dental implant has a longitudinal direction and is at least partially conical in the longitudinal direction.

16. Set according to claim 14, wherein the central part of at least one of the supported spring elements is elastically deflectable in a radial direction such as to form a removable snap connection with at least one of a corresponding protrusion and recess of the dental implant.

17. Secondary part according to claim 1, characterized in that the secondary part consists of a single material.

* * * * *